United States Patent [19]
Gedeon et al.

[11] Patent Number: 5,593,262
[45] Date of Patent: Jan. 14, 1997

[54] REMOVABLE PLASTIC BOSS FOR AUTOMOBILE INSTRUMENT PANEL

[75] Inventors: Dale G. Gedeon, Sterling Heights; Mark B. Schatz, Metamora; Robert J. Stephens; Shawn E. Roberts, both of Clarkston, all of Mich.

[73] Assignee: Chrysler Corporation, Auburn Hills, Mich.

[21] Appl. No.: 450,328

[22] Filed: May 25, 1995

[51] Int. Cl.$^6$ .......................... F16B 13/06; F16B 37/04
[52] U.S. Cl. ............................ 411/182; 411/60; 411/508; 411/913
[58] Field of Search .................... 411/55, 57, 60, 411/182, 508, 913

[56] References Cited

U.S. PATENT DOCUMENTS

| | | | |
|---|---|---|---|
| 2,836,214 | 5/1958 | Rapata. | |
| 2,975,814 | 3/1961 | Tinnerman | 411/182 |
| 3,141,489 | 7/1964 | Rapata | 411/182 |
| 3,574,899 | 4/1971 | Fisher | 24/73 |
| 3,756,116 | 9/1973 | Schuplin. | |
| 3,869,958 | 3/1975 | Murayama. | |
| 4,293,260 | 10/1981 | Kojima et al. | 411/44 |
| 4,506,419 | 3/1985 | Mitomi | 24/297 |
| 4,521,148 | 6/1985 | Tanaka | 411/182 |
| 4,906,152 | 3/1990 | Kurihara | 411/182 |
| 5,028,190 | 7/1991 | Loughlin, Jr. et al. | 411/182 |
| 5,046,904 | 9/1991 | Malinow | 411/182 X |

FOREIGN PATENT DOCUMENTS

2813749  10/1978  Germany ........................... 411/182

*Primary Examiner*—Neill R. Wilson
*Attorney, Agent, or Firm*—Margaret A. Dobrowitsky

[57] ABSTRACT

A removable plastic automobile boss has a body formed with a bore for receiving a threaded fastener. A flat seating flange is formed on the front portion of the body, the flange including left and right ears respectively protruding outwardly from the left and right sides of the body. Top and bottom ramp-shaped engagement abutments are formed on the body. Further, a slit is formed on the body such that the top and bottom engagement abutments ride against the periphery of an instrument panel receptacle when the boss is advanced into the receptacle, thereby causing the top and bottom halves to be urged toward each other to permit the boss to be fully inserted into the receptacle. The front portion snappingly resumes an engaged configuration when the engagement abutments clear the periphery to sandwich the periphery between the engagement abutments and the seating flange to engage the boss with the instrument panel.

6 Claims, 1 Drawing Sheet

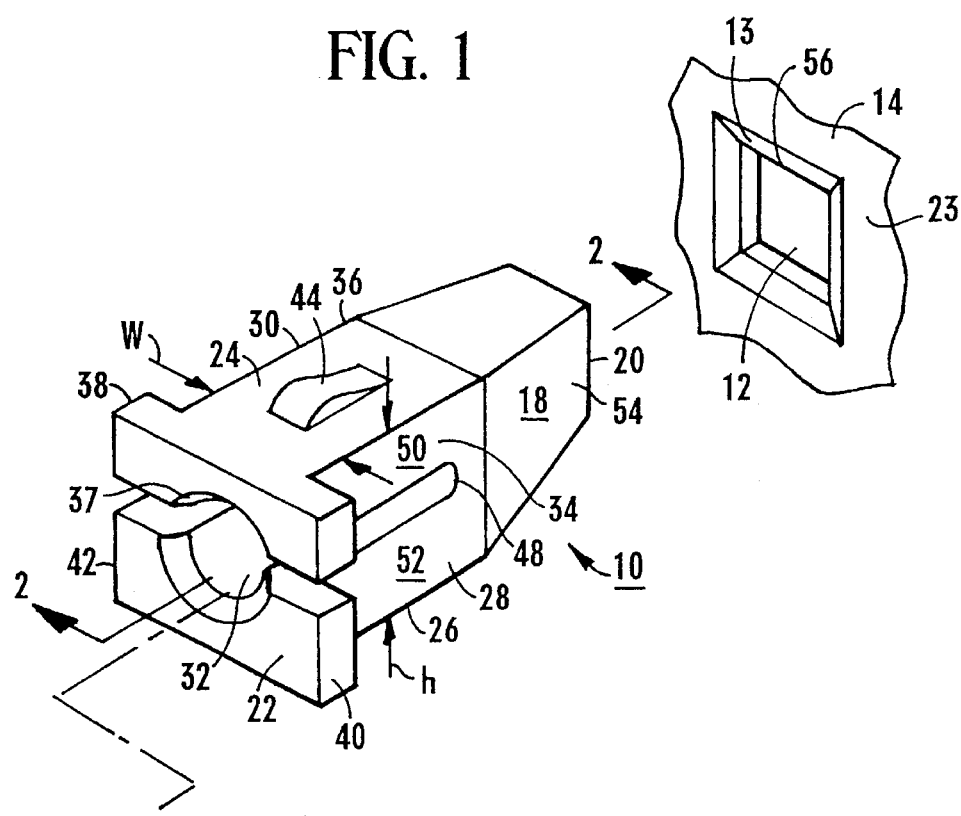
FIG. 1
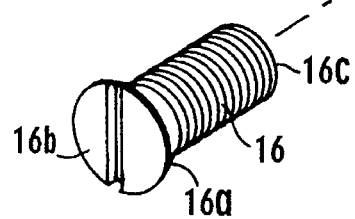
FIG. 2
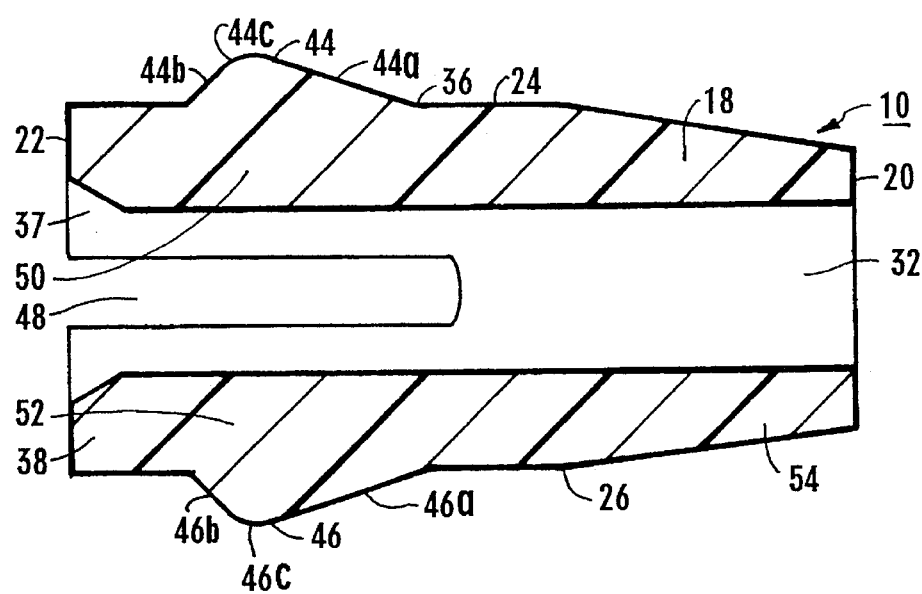

5,593,262

REMOVABLE PLASTIC BOSS FOR AUTOMOBILE INSTRUMENT PANEL

FIELD OF THE INVENTION

The present invention relates generally to connectors for fastening components to automobile instrument panels, and more particularly to recyclable removable bosses for fastening components to automobile instrument panels.

BACKGROUND OF THE INVENTION

Instruments and other components, e.g., molding, are typically fastened to instrument panels of automobiles by means of screws and other like threaded fasteners. To fasten an instrument to a panel, a threaded male fastener typically is engaged with the instrument, and the male fastener is then threadably engaged with a complementarily-threaded female receiver, referred to as a "boss", that is associated with a receptacle on the instrument panel.

One way to configure the boss of an instrument panel is to integrally form the boss on the inside surface of the receptacle of the instrument panel. Unfortunately, it happens that such integrally-formed bosses cannot easily be made to meet engineering requirements, e.g., torque requirements. This is primarily because the relatively small bosses are formed during a process that is designed to produce a relatively large instrument panel. Indeed, it has been found that in such instrument panels, many of the threaded fasteners tend to be improperly seated in their associated bosses, or tend to become completely disengaged from their associated boss. The bosses themselves are subject to becoming easily stripped. This in turn results in improper engagement of instruments with the panel.

To overcome the drawbacks inherent in bosses that are formed integrally with an instrument panel, small, removable metal clips have been introduced which can be inserted into the receptacles of an instrument panel for engaging the threaded male fasteners associated with automobile instruments. Because they are manufactured-apart from the large instrument panel, using production processes specifically designed for making small fasteners, such metal clips are typically effective for their intended purpose.

While effective for their intended purpose, however, it will be readily appreciated that metal clips add weight to the automobile, and even the matter of a few additional ounces can have complicate the overall design of an automobile. Moreover, when it is desired to remove the instrument panel from the automobile for recycling the panel, the metal clips must be painstakingly removed from the instrument panel first. This is because instrument panels are ordinarily made of plastic, and in the case of recycling instrument panels, metal cannot be recycled with plastic. It will be appreciated that it is cumbersome to remove many small metal clips from each instrument panel to be recycled, and adds costs to recycling.

Accordingly, it is an object of the present invention to provide a plastic boss for an automobile instrument panel that can be recycled along with the instrument panel itself. Another object of the present invention is to provide a removable plastic boss for an automobile instrument panel that is lightweight, easy to use, and cost-effective.

SUMMARY OF THE INVENTION

A removable plastic boss is disclosed which is snappingly engageable with a receptacle defining a periphery in an instrument panel of an automobile. The boss includes a body that defines a back end, and the back end is advanceable into the instrument panel. Further, the body is formed with a front end which is opposed to the back end, and the body also has top, bottom, left, and right sides extending between the front and back ends.

In accordance with the present invention, the body is formed with a cylindrical bore from the front end to the back end for receiving a threaded fastener therein to thereby hold an instrument or molding against the instrument panel. As intended by the present invention, the body includes a parallelepiped-shaped front portion extending from the front end to a break point substantially midway between the front and back ends. Also, the body includes a flat seating flange which is formed on the front portion at the front end, the flange including left and right ears respectively protruding outwardly from the left and right sides. Top and bottom ramp-shaped engagement abutments are formed on the front portion on the top and bottom sides thereof, respectively, and a slit is formed in the front portion from the front end to the break point.

Per the present invention, the slit extends transversely through the front portion from the left side to the right side to establish top and bottom halves of the front portion. Accordingly, the front portion is materially biased to an engaged configuration, wherein the top and bottom halves are distanced from each other. Also, the front portion is deformable to an advancement configuration, wherein the top and bottom halves are urged toward each other.

In one presently preferred embodiment, the body is advanceable back end first into the receptacle to cause the top and bottom ramp-shaped engagement abutments to ride against the periphery of the receptacle. Thereby, the front portion is deformed to the advancement configuration to permit the boss to be fully inserted into the receptacle. Then, when the engagement abutments clear the periphery, the front portion snappingly resumes the engaged configuration to sandwich the periphery between the engagement abutments and the seating flange to engage the boss with the instrument panel.

In the preferred embodiment, the body includes a back portion extending from the break point to the back end. The back portion defines top and bottom sides which taper toward each other from the break point to the back end. Also, the back portion defines left and right sides which taper toward each other from the break point to the back end, thereby facilitating insertion of the body into the receptacle.

In another aspect of the present invention, an assembly is disclosed for fixedly holding an object in an automobile. The assembly of the present invention includes an instrument panel formed with a receptacle defining a periphery. Also, the assembly includes a threaded fastener, and a removable plastic boss is snappingly engageable with the receptacle. The boss includes a body defining a back end advanceable into the instrument panel, a front end opposed to the back end, and top, bottom, left, and right sides extending therebetween. Moreover, the body is formed with a cylindrical bore from the front end to the back end for receiving the threaded fastener therein.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is an exploded perspective view of the boss clip of the present invention, with portions of the threaded fastener and instrument panel broken away for clarity; and FIG. 2 is a cross-sectional view as seen along the line 2—2 in FIG. 1.

DETAILED DESCRIPTION OF THE PREFERRED EMBODIMENT

Referring initially to FIG. 1, a removable plastic boss is shown, generally designated 10. As shown, the boss 10 can snap into a receptacle 12 of an automobile instrument panel 14. In the preferred embodiment, the receptacle 12 includes a recess 13. Then, a threaded fastener 16, such as a screw, can be engaged with the boss 10 to thereby firmly hold a component, such as an instrument (not shown) through which the fastener 16 is positioned, in juxtaposition with the instrument panel 14.

Preferably, the boss 10 is made of hard, relatively rigid plastic, such as polycarbonate (PC), acrylonitrile butadiene styrene (ABS), or a terpolymer alloy of ABS, or an alloy of ABS/PC, by appropriate manufacturing processes, e.g., injection molding. In one presently preferred embodiment, the boss 10 is made of a plastic sold by Dow Chemical Co. under the trademark Pulse 830 resin.

It has been found that when configured as shown and made of the plastic material disclosed, the boss 10 meets established torque requirements. In other words, the fastener 16 may be threadably engaged with the boss 10 and tightened with an industry specified torque without stripping the boss 10. Further, when made of plastic the boss 10 weighs less than it otherwise would if it were made of metal. In an automobile which uses many bosses, such a reduction in weight can have significant advantages. Still further, when made of plastic the boss 10 is less expensive to manufacture than it otherwise would be if it were made of metal.

FIGS. 1 and 2 show that the boss 10 includes a body 18 that has a back end 20. In accordance with the present invention, the back end 20 of the body 18 can be advanced into the receptacle 12 of the instrument panel 14.

Additionally, the body 18 has a front end 22 that is substantially flush with the surface 23 of the panel 14 when the boss 10 is installed. Further, the body 18 defines top, bottom, left, and right sides 24, 26, 28, 30, respectively, which extend between the front and back ends 22, 20. It is to be understood, however, that the terms "top", "bottom", "left", and "right" are used by way of illustration and not of limitation to the possible orientations of the boss 10 within the receptacle 14.

FIGS. 1 and 2 show that a smooth cylindrical bore 32 is formed in the body 18 from the front end 22 to the back end 20 for receiving the threaded fastener 16 therein. As intended by the present invention, the threaded fastener 16 is self-tapping in the bore 32, i.e., the threaded fastener 16 threadably engages the body 18 within the bore 32. Thereby, a component, e.g., an instrument or molding, is held against the instrument panel 14. Furthermore, a distal end 16c of the threaded fastener 16 is enclosed within bore 32, such that the plastic boss 10 surrounds and thereby electrically insulates the distal end 16c from electrical components (not shown) within the instrument panel 14.

As further shown, the body 18 includes a parallelepiped-shaped front portion 34 which extends from the front end 22 to a break point 36. As additionally shown, the break point 36 is substantially midway between the front and back ends 22, 20. In the presently preferred embodiment, the front portion 34 has a width "w" of about eight and one-half millimeters (8.5mm), and a height "h" of about seven millimeters (7mm).

If desired, the front portion 34 can be formed with a skirt 37 which is countersunk inwardly toward the bore 32 from the front end 22 and which circumscribes the bore 32. The skilled artisan will appreciate that a head 16a of the threaded fastener 16 is received in the skirt 37 when the fastener 16 is engaged with the body 18. Consequently, an end surface 16b of the fastener 16 is substantially flush with the front end 22 of the body 18, when the fastener 16 is fully engaged with the body 18.

FIGS. 1 and 2 further show that a flat, parallelepiped-shaped seating flange 38 is formed on the front portion 34 of the body 18 at the front end 22 of the body 18. The seating flange 38 includes left and right ears 40, 42 that respectively protrude outwardly from the left and right sides 30, 28 of the body 18. It is to be understood in reference to FIG. 1 that the seating flange 38 rests within the recess 13 of the receptacle 12, with the front end 22 of the body 18 flush with the surface 23 of the panel 14.

Further, top and bottom ramp-shaped engagement abutments 44, 46 are formed on the front portion 34 of the body 18 on the top and bottom sides 24, 26, respectively. As best shown in FIG. 2, each abutment 44, 46 is formed with a respective rearwardly-oriented gently sloped surface 44a, 46a which is seamlessly contiguous with a respective frontwardly-oriented steeply sloped surface 44b, 46b at a respective gently arcuate apex 44c, 46c.

Moreover, a slit 48 is formed in the front portion 34 from the front end 22 to the break point 36, and the slit 48 extends transversely through the front portion 34 from the left side 28 of the body 18 to the right side 30. Thereby, top and bottom halves 50, 52 of the front portion 34 are established.

Consequently, it may now be appreciated that the front portion 34 of the body 18 is materially biased to the engaged configuration shown in FIG. 1. In the engaged configuration, the top and bottom halves 50, 52 are distanced from each other. Moreover, the front portion 34 can be deformed to an advancement configuration, wherein the top and bottom halves 50, 52 are slightly urged toward each other, i.e., each of the top and bottom half 50, 52 is urged slightly into the slit 48.

Still referring to FIGS. 1 and 2, a back portion 54 of the body 18 is established from the break point 36 to the back end 20 of the body 18. FIGS. 1 and 2 show that the back portion 54 is contiguous to and is formed integrally with the front portion 34. Unlike the front portion 34, however, in the case of the back portion 54 the top and bottom sides 24, 26 taper toward each other from the break point 36 to the back end 20. Likewise, the left and right sides 28, 30 taper toward each other from the break point 36 to the back end 20. It is to be appreciated that by tapering the sides of the back portion 54 as disclosed, insertion of the boss 10 into the receptacle 12 is facilitated.

Furthermore, the sides of the back portion 54 are continuous, in that they are uninterrupted by the slit 48, which terminates at the break point 36. Accordingly, the back portion 54 completely surrounds and firmly engages the fastener 16.

In describing the operation of the boss 10, continued reference is made to FIGS. 1 and 2. With the above-described combination of structure, the body 18 can be advanced, back end 20 first, into the receptacle 12 of the instrument panel 14. As the body 18 is advanced into the instrument panel 14, the gently sloped surfaces 44a, 46a of the top and bottom engagement abutments 44, 46 ride against the periphery 56 of the receptacle 12. As the abutments 44, 46 ride against the periphery 56 of the receptacle 12, the front portion 34 of the body 18 is deformed to the advancement configuration to permit the body 18 to be fully inserted into the receptacle 12.

Once the body 18 is fully inserted, the engagement abutments 44, 46 clear the periphery 56 of the receptacle 12, allowing the front portion 34 of the body 18 to snappingly resume the engaged configuration. The periphery 56 of the receptacle 12 is sandwiched between the seating flange 38 and the steeply sloped surfaces 44b, 46b of the engagement abutments 44, 46, to thereby engage the body 18 with the instrument panel 14. Then, the fastener 16 can be engaged with the boss 10 as appropriate to hold a component in juxtaposition with the instrument panel 14.

While the particular REMOVABLE PLASTIC BOSS FOR AUTOMOBILE INSTRUMENT PANEL as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A removable plastic boss snappingly engageable with a receptacle defining a periphery in an instrument panel of an automobile, comprising:

a body defining a back end advanceable into the instrument panel, a front end opposed to the back end, and top, bottom, left, and right sides extending therebetween, the body being formed with a cylindrical bore from the front end to the back end for receiving a threaded fastener therein to thereby hold an instrument or molding against the instrument panel, the body including:

a parallelepiped-shaped front portion extending from the front end to a break point substantially midway between the front and back ends;

a flat seating flange formed on the front portion at the front end, the flange including left and right ears respectively protruding outwardly from the left and right sides;

top and bottom ramp-shaped engagement abutments formed on the front portion on the top and bottom sides thereof, respectively, each engagement abutment including a respective rearwardly-oriented gently sloped surface and a respective frontwardly-oriented steeply sloped surface seamlessly joining with the rearwardly-oriented gently sloped surface at a respective gently arcuate apex;

a slit formed in the front portion from the front end to the break point, the slit extending transversely through the front portion from the left side to the right side to establish top and bottom halves of the front portion, such that the front portion is materially biased to an engaged configuration, wherein the top and bottom halves are distanced from each other, and such that the front portion is deformable to an advancement configuration, wherein the top and the bottom halves are urged towards each other.

2. The boss of claim 1, wherein the body is advanceable back end first into the receptacle to cause the top and bottom ramp-shaped engagement abutments to ride against the periphery of the receptacle and thereby deform the front portion to the advancement configuration to permit the boss to be fully inserted into the receptacle, the front portion snappingly resuming the engaged configuration when the engagement abutments clear the periphery to sandwich the periphery between the engagement abutments and the seating flange to engage the boss with the instrument panel.

3. The boss of claim 2, wherein the body includes a back portion extending from the break point to the back end, the back portion defining top and bottom sides tapering toward each other from the break point to the back end, the back portion also defining left and right sides tapering toward each other from the break point to the back end.

4. An assembly for fixedly holding an object in an automobile, comprising:

an instrument panel formed with a receptacle defining a periphery;

a threaded fastener; and a removable plastic boss snappingly engageable with the receptacle, the boss including a body defining a back end advanceable into the instrument panel, a front end opposed to the back end, and top, bottom, left, and right sides extending therebetween, the body being formed with a cylindrical bore from the front end to the back end for receiving the threaded fastener therein, the body including at least one engagement abutment formed with a rearwardly-oriented gently sloped surface and a frontwardly-oriented steeply sloped surface seamlessly joining with the rearwardly-oriented gently sloped surface at a gently arcuate apex.

5. The assembly of claim 4, wherein the body includes:

a parallelepiped-shaped front portion extending from the front end to a break point substantially midway between the front and back ends;

a flat seating flange formed on the front portion at the front end, the flange including left and right ears respectively protruding outwardly from the left and right sides;

top and bottom ramp-shaped engagement abutments formed on the front portion on the top and bottom sides thereof, respectively; and a slit formed in the front portion from the front end to the break point, the slit extending transversely through the front portion from the left side to the right side to establish top and bottom halves of the front portion, wherein the front portion is deformable to an advancement configuration by advancing the body back end first into the receptacle to cause the top and bottom ramp-shaped engagement abutments to ride against the periphery and thereby cause the top and bottom halves to be urged toward each other to permit the boss to be fully inserted into the receptacle, the front portion snappingly resuming an engaged configuration, wherein the top and bottom halves are distanced from each other when the engagement abutments clear the periphery to sandwich the periphery between the engagement abutments and the seating flange to engage the boss with the instrument panel.

6. The assembly of claim 5, wherein the body includes a back portion extending from the break point to the back end, the back portion defining top and bottom sides tapering toward each other from the break point to the back end, the back portion also defining left and right sides tapering toward each other from the break point to the back end.

* * * * *